7753X

No Printed Specification Available

T. W. Harvey,

Spike.

Patented Sep. 13, 1833.

N. PETERS, PHOTO-LITHOGRAPHER, WASHINGTON, D. C.

Thomas W. Harvey, of Jamestown, New York.

Letters Patent.

The schedule referred to in these Letters Patent and making part of the same containing a description in the words of the said Thomas W. Harvey himself of his improvement in the manufacture of Nails or Spikes, denominated the grooved and flanched spike.

To all whom it may concern.

Be it known that I Thomas W. Harvey of Jamestown Chautauque County in the State of New York, have invented a new manufacture of Nails or Spikes, which I denominate, the grooved and flanched spike, to be used in the fixing of rails, and chairs in the construction of Rail roads, and for other purposes where it is desirable to attach articles by nailing more firmly than it can be done by nails or spikes of the ordinary construction, and I do hereby declare the following is a full and exact description of the construction of, or form given to, such nails or spikes.

When these spikes are to be used for plate rails on rail roads or for other similar purposes, the head and neck of the spike, for thickness of the rail, is made in the usual form, but the remainder of the shank or stem of the spike from the neck to the point, or until the point is approached, is grooved on two sides in such a way as to leave four projecting flanches, or fillets thereon one along each edge.

Figure 1:
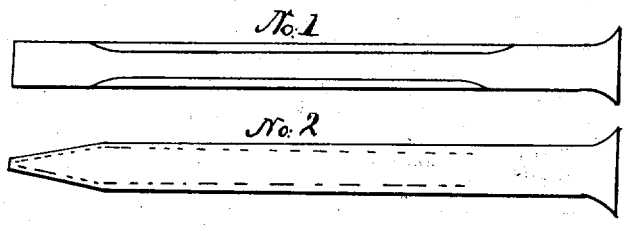
Figure 2:
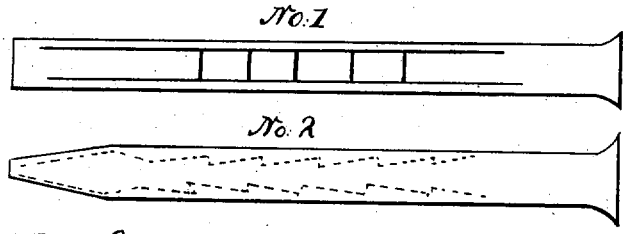
Figure 3:
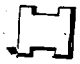

The section of the spike in the grooved part of the stem will then appear somewhat in the form shown in Fig. 3 in the accompanying Drawing. Fig. 1 & 2. represent two variations in the shape given to the lower part of the groove; which however may be indefinitely modified, without changing the principle. No. 1 in each figure, shows the grooved, & No. 2. the plain side of the spike; the dotted lines in the latter representing the manner in which the bottom of the groove may be swelled or serrated, for the purpose of causing it to hold the more firmly in the wood, I do

1153X

[illegible] think it necessary to describe any machinery by which such nails, [illegible], may be made, that which I use is of my own invention, and for which I obtained a Patent on the 24th day of January A.D. 1832, but they may be made by any adequate implements or Machinery.

What I claim as my invention, is, giving a new form to nails or spikes by grooving them on their sides, so as to form flanches or fillets on their angles; whether the groove be made of equal depth throughout its whole length or whether the bottom thereof be undulating [illegible], or serrated in the manner herein described, or made of iron, copper, or other metal, or varied in any way which does not essentially change the principle or manner of construction.

Witness
Jas. Hoyle
Saml. Hopkins

Thomas W. Harvey

600 [illegible]

[illegible]

Dr in port folio